(12) United States Patent
Mondragon-Parra

(10) Patent No.: US 11,686,350 B2
(45) Date of Patent: Jun. 27, 2023

(54) TRIPOT HOUSING WITH HYBRID-ELLIPTICAL TRACKS

(71) Applicant: Steering Solutions IP Holding Corporation, Saginaw, MI (US)

(72) Inventor: Eduardo R. Mondragon-Parra, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 180 days.

(21) Appl. No.: 17/131,743

(22) Filed: Dec. 23, 2020

(65) Prior Publication Data
US 2021/0332856 A1    Oct. 28, 2021

Related U.S. Application Data

(60) Provisional application No. 63/016,191, filed on Apr. 27, 2020.

(51) Int. Cl.
*F16D 3/205* (2006.01)
*F16D 3/202* (2006.01)

(52) U.S. Cl.
CPC .... *F16D 3/2055* (2013.01); *F16D 2003/2026* (2013.01); *Y10S 72/714* (2013.01); *Y10S 464/905* (2013.01)

(58) Field of Classification Search
CPC .......... F16D 3/2055; F16D 2003/2026; Y10S 72/714; Y10S 464/905
USPC ........................................................ 464/111
See application file for complete search history.

(56) References Cited

U.S. PATENT DOCUMENTS 5,203,741 A * 4/1993 Turner ................. F16D 3/2055
464/111
8,608,578 B2 * 12/2013 Oh ........................ F16D 3/2055
464/111

* cited by examiner

*Primary Examiner* — Greg Binda
(74) *Attorney, Agent, or Firm* — Dickinson Wright PLLC

(57) ABSTRACT

A tripot housing includes a housing body that extends between a first housing end and a second housing end along a longitudinal central axis. The housing body defines a guide channel that extends from the first housing end toward the second housing end. The guide channel has a first wall, a second wall, and a third wall that extends between the first wall and the second wall. An elliptical contact surface area transitions the first wall with the third wall and the second wall with the third wall, with the elliptical contact surface areas being configured for engagement with an outer roller of a roller assembly to inhibit a locking condition.

18 Claims, 3 Drawing Sheets

TRIPOT HOUSING WITH HYBRID-ELLIPTICAL TRACKS

CROSS-REFERENCE TO RELATED APPLICATIONS

This application claims the benefit of U.S. Provisional Application Ser. No. 63/016,191, filed Apr. 27, 2020, which is incorporated herein by reference in its entirety.

BACKGROUND OF THE INVENTION

Tripot joints interconnect rotary shaft members of a vehicle. The tripot joint includes a tripot housing having an inner surface providing a plurality of roller tracks for guiding a plurality of roller assemblies.

Current tripot housings may allow excessive tipping of a roller assembly, and in particular, an outer roller thereof, within a roller track, with the tipping being observed along a plane extending transverse to a longitudinal axis of the tripot housing.

Excessive tipping of the roller assembly, and outer roller thereof, relative to the roller track, along with lack of restoring moment of the roller assembly, may result in a locking condition of the roller assembly. A locking condition is highly undesirable, as the locking prevents intended, low friction rolling motion of the roller assembly, and thus, premature wear and failure may result. In addition to promoting wear, highly undesirable noise, vibration, harness (NVH) may result from a locking condition, with the NVH being highly undesirable and readily observable by a passenger in the vehicle.

SUMMARY OF THE INVENTION

It is an object of the present disclosure to provide a tripot joint that overcomes at least some of the drawbacks discussed above with known tripot joints.

It is a further object of the present disclosure to provide a tripot housing having roller tracks that facilitate overcoming at least some of the drawbacks discussed above with known tripot housings.

It is a further object of the present disclosure to provide a tripot housing having roller tracks that facilitate inhibiting a locking condition of roller assemblies within in the roller tracks.

It is a further object of the present disclosure to provide a tripot housing having roller tracks that minimize tipping of roller assemblies within in the roller tracks, with the tipping being viewed along a plane extending transversely to a longitudinal axis of the tripot housing.

It is a further object of the present disclosure to provide a tripot housing having roller tracks that optimize a restoring moment of the roller assemblies within the roller tracks.

According to an embodiment of the present disclosure, a tripot housing is provided including a housing body that extends between a first housing end and a second housing end along a longitudinal axis. The housing body defines a roller track, also referred to as guide channel, that extends from the first housing end toward the second housing end. The guide channel has a first wall, a second wall, and a third wall that extends between the first wall and the second wall. A first outer transition region extends between the first wall and the third wall and a second outer transition region extends between the second wall and third wall. A first inner transition region extends between the first wall and a first separator and a second inner transition region extends between the second wall and a second separator. At least one of the first outer transition region, the second outer transition region, the first inner transition region and the second inner transition region is formed having an elliptical contour.

In accordance with another aspect of the disclosure, the first outer transition region and the second outer transition region can be formed having an elliptical contour.

In accordance with another aspect of the disclosure, the first inner transition region and the second inner transition region can be formed having an elliptical contour.

In accordance with another aspect of the disclosure, the first outer transition region and the second outer transition region can be formed having an outer elliptical contour and the first inner transition region and the second inner transition region can be formed having an inner elliptical contour, with the outer elliptical contour and the inner elliptical contour being different.

In accordance with another aspect of the disclosure, the outer elliptical contour has an outer major diameter and the inner elliptical contour has an inner major diameter, wherein the outer major diameter can be formed being greater than the inner major diameter.

In accordance with another aspect of the disclosure, the outer major diameter and the inner major diameter can be arranged to extend generally transversely to the first wall and the second wall.

In accordance with another aspect of the disclosure, a tripot assembly is provided. The assembly includes a housing body extending between a first housing end and a second housing end along a longitudinal axis. The housing body defines a plurality of guide channels spaced from one another by a separator. The guide channels extend from the first housing end toward the second housing end, with each of the guide channels having a first wall, a second wall, and a third wall extending between the first wall and the second wall. A first outer transition region extends between the first wall and the third wall and a second outer transition region extends between the second wall and third wall. A first inner transition region extends between the first wall and a first separator and a second inner transition region extends between the second wall and a second separator. At least one of the first outer transition region, the second outer transition region, the first inner transition region and the second inner transition region having a concave elliptical contour. A separate roller assembly is disposed in each of the guide channels. Each roller assembly has an inner roller member and an outer roller member. The inner roller member is disposed on a spider member and the outer roller member is disposed in engagement with the first wall, the second wall and the third wall. The outer roller member has a convex outer surface configured for engagement with the first outer transition region and the second outer transition region and a convex inner surface configured for engagement with the first inner transition region and the second inner transition region.

In accordance with another aspect of the disclosure, the convex inner surface and the convex outer surface can be provided having a constant radius.

According to yet another embodiment of the present disclosure, a method of manufacturing a tripot housing is provided. The method includes providing a housing body extending between a first housing end and a second housing end along an axis; forming a plurality of guide channels that extend axially from the first housing end toward the second housing end with the plurality of guide channels being radially spaced apart from each other about the longitudinal axis by separators; forming each of the guide channels having a first wall, a second wall, and a third wall extending between the first wall and the second wall with a first outer transition region extending between the first wall and the third wall and a second outer transition region extending between the second wall and third wall, and with a first inner transition region extending between the first wall and a first separator and a second inner transition region extending between the second wall and a second separator; and forming at least one of the first outer transition region, the second outer transition region, the first inner transition region and the second inner transition region having an elliptical contour.

In accordance with another aspect of the disclosure, the method can further include forming each of the first outer transition region, the second outer transition region, the first inner transition region and the second inner transition region having an elliptical contour.

In accordance with another aspect of the disclosure, the method can further include forming the first outer transition region and the second outer transition region having an outer elliptical contour having an outer major diameter and forming the first inner transition region and the second inner transition region having an inner major diameter, with the outer major diameter being greater than the inner major diameter.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the non-limiting embodiments of the invention that is embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
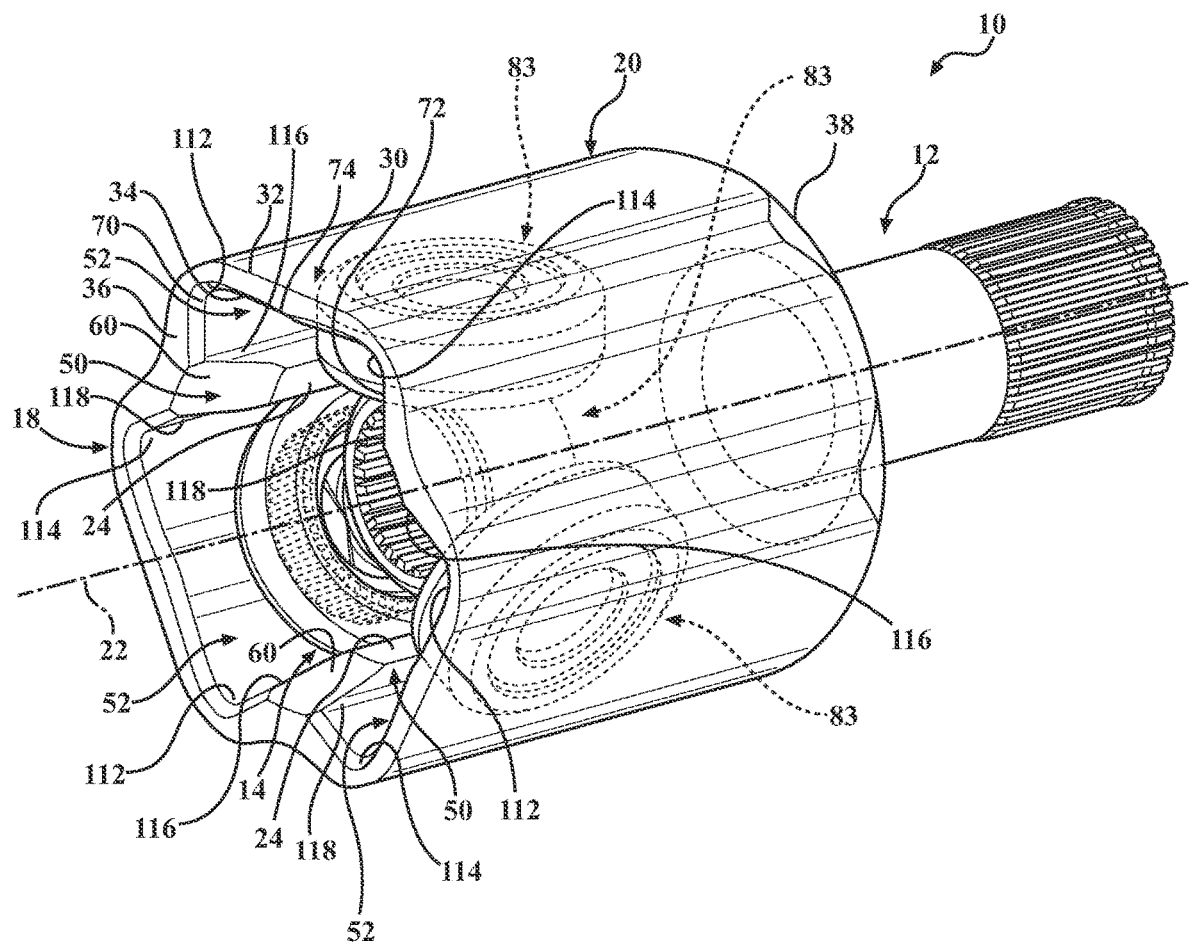
FIG. 1 is a perspective view of a tripot joint in accordance with an aspect of the disclosure.

Referring to FIG. 1, a tripot joint 10 enables torque transfer between two rotatable shaft members with possible axial position or angular position changes relative to each other. The tripot joint 10 is configured to transmit torque from the first shaft member 12 to a second shaft member (now shown) through a spider member 14 that is operatively connected to the second shaft member through various rotational speeds, joint angles, or telescopic positions, as is well known and understood by one possessing ordinary skill in the art of tripot joint technology.

The tripot joint 10 includes a tripot housing 20 that extends from the first shaft member 12 along a longitudinal axis, shown as a longitudinal central axis 22. The combination of the tripot housing 20 and the first shaft member 12 are rotatable in fixed, conjoint relation with one another about the longitudinal central axis 22. A direction of travel of a roller assembly, also referred to as ball set, ball member or ball assembly 16, rotatably disposed on the spider member 14 is substantially parallel to the longitudinal central axis 22.

The tripot housing 20 includes a housing body 30. The housing body 30 has an outer surface 32 and an inner bore 18 bounded by an inner surface 34, each extending along the longitudinal central axis 22 between a first housing end 36 and the second housing end 38. The first shaft member 12 is fixedly connected to the housing body 30 proximate the second housing end 38, and can be formed as a monolithic piece of material with the housing body 30, or as a separated piece of material that is subsequently fixed to the housing body 30, such as via a weld joint, by way of example and without limitation.

Figure 2:
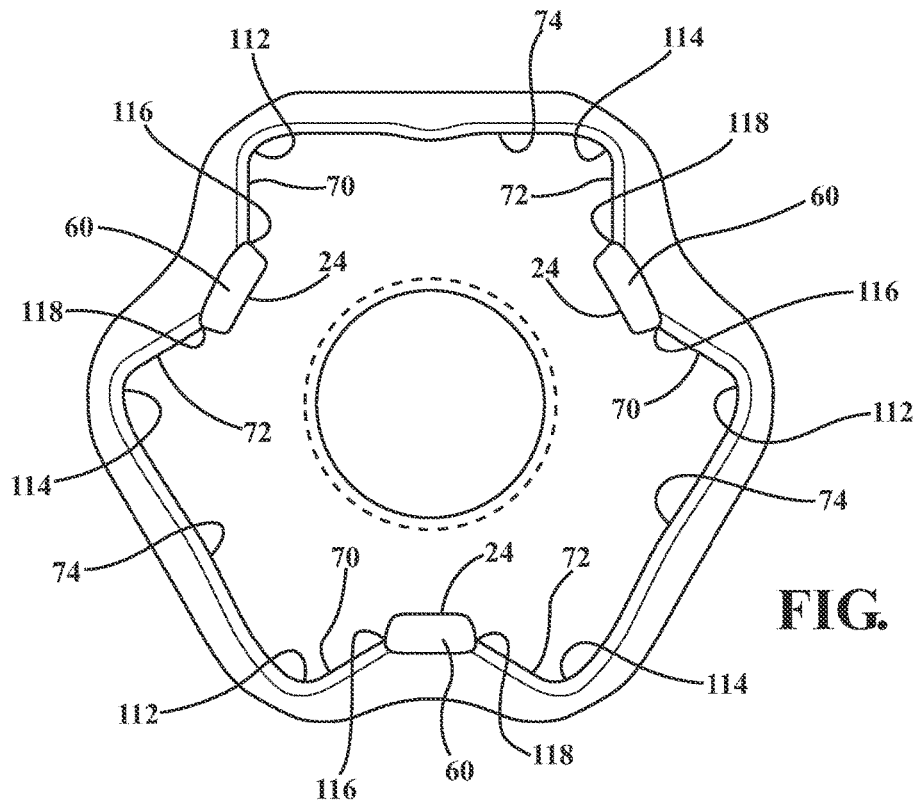
FIG. 2 is an end view of a tripot housing of the tripot assembly of FIG. 1.
Figure 2A:
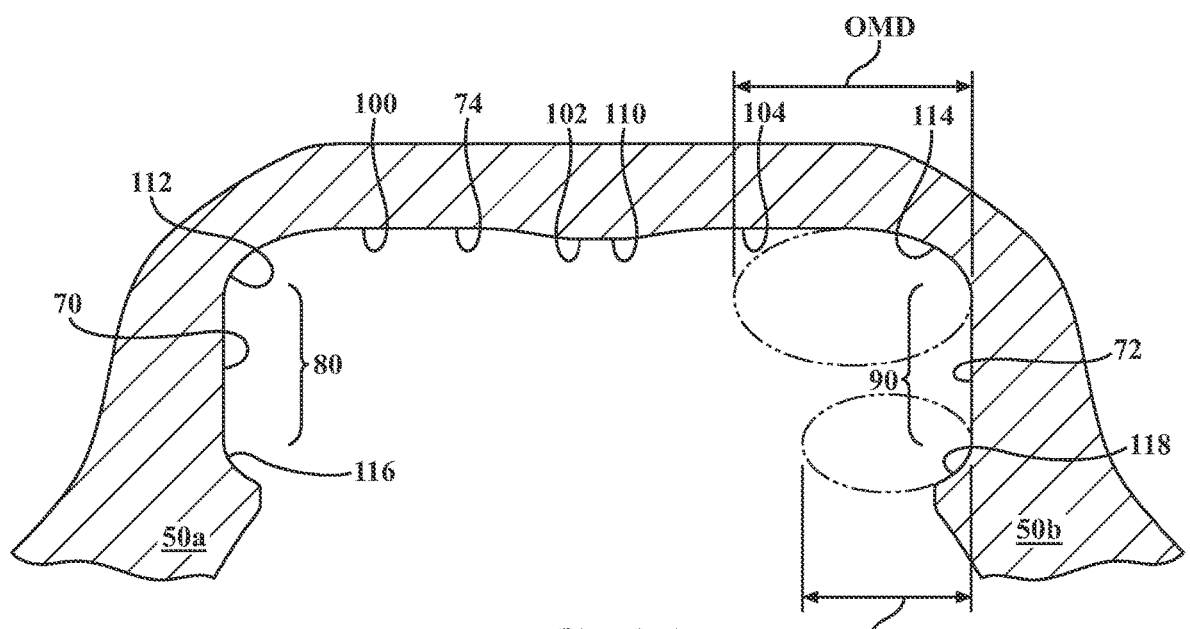
FIG. 2A is an enlarged partial view of an encircled region 2A of the tripot housing of FIG. 2 illustrating a contour of a ball track of the tripot housing.
Figure 2B:
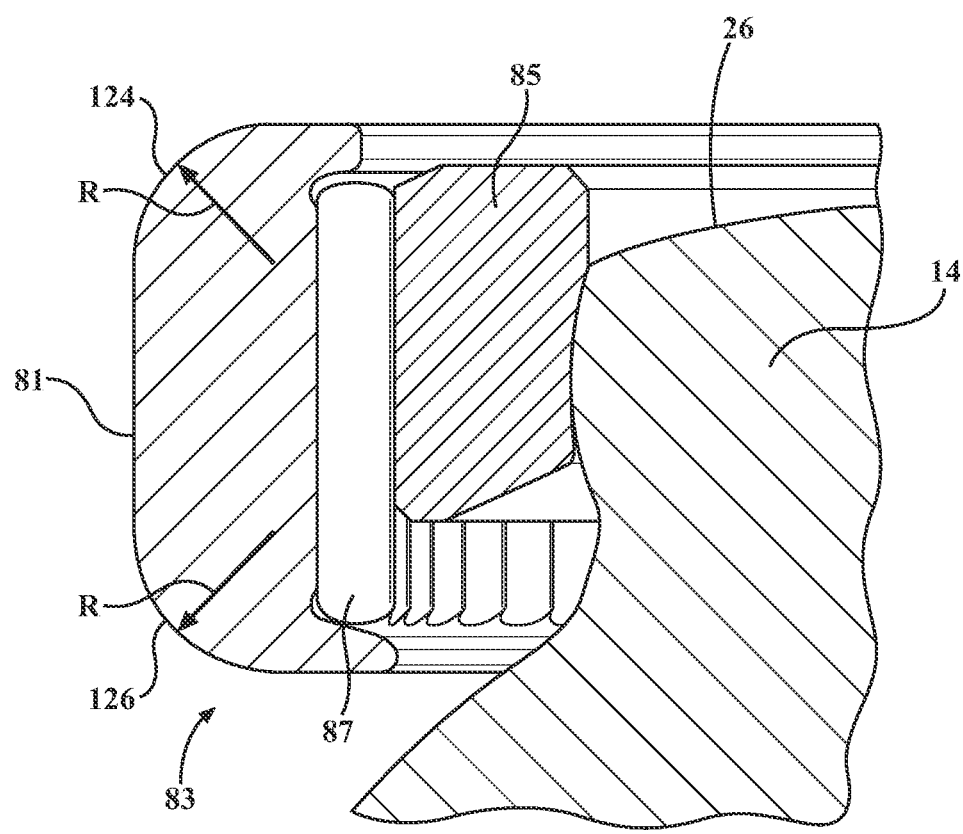
FIG. 2B is a partial cross-sectional view of a roller assembly disposed on a spider taken generally parallel to a central axis of the roller assembly.

Referring to FIGS. 1-2B, the inner surface 34 of the housing body 30 defines at least one, and preferably a plurality of separators, shown as three separators 50, and a plurality of roller tracks, also referred to as ball tracks, lubricated ball bores, or guide channels 52. Each separator 50 extends radially from an outermost region of the inner surface 34 toward the longitudinal central axis 22 to a radially inwardly facing free end, also referred to as peak 24. The separators 50 extend axially from the first housing end 36 toward the second housing end 38. The separators 50 can be formed having a chamfer 60 disposed proximate the first housing end 36. The chamfer 60 extends from the inner surface 34 of the housing body 30 to the peak 24 of the separator 50, wherein the chamfer 60 extends in an oblique relationship with the inner surface 34 and the peak 24 of the separator 50.

Each guide channel 52 extends axially along and substantially parallel (substantially is intended to mean than rather than being truly parallel, it may be up to 5 degrees off true parallel) or truly parallel to the axis 22. Each guide channel 52 extends radially inwardly from a respective pair of peaks 24 toward the outer surface 32 of the housing body 30 between circumferentially spaced apart separators 50. The tripot joint 10 includes three guide channels 52 that are circumferentially spaced apart from each other about the axis 22 by intermediate separators 50 such that each guide channel 52 is bounded in part and disposed between a pair of separators 50. Each guide channel 52 is configured to receive a portion of a trunnion 26 of the spider member 14 on which a respective ball assembly 83 is disposed, wherein the spider member 14 is received for translation along the longitudinal central axis 22 within the inner bore 18 of the housing body 30 of the tripot housing 20.

Each guide channel 52 of the housing includes a first wall 70, a second wall 72, and a third wall 74. The first wall 70 and the second wall 72 extend radially away from the axis 22 toward the third wall 74.

The first wall 70 is disposed opposite the second wall 72, such that the first wall 70 and the second wall 72 are in facing, substantially parallel relation with one another (substantially is intended to mean that due to any curvature with the first and second walls 70, 72 that they may not be truly parallel with one another). The third wall 74 extends between the first wall 70 and the second wall 72. The third wall 74 is disposed further from the axis 22 than the first wall 70 and the second wall 72 to establish a radially outermost surface of the inner surface 34. The first wall 70 and the second wall 72 have a generally arcuate or a generally concave profile, at least in a transition region with the third wall 74, when viewed in a cross-section looking along a plane transverse to the longitudinal central axis 22, as shown in FIG. 2A.

The first wall 70 defines a first functional area 80. The first functional area 80 extends between the separator 50 and the third wall 74. The first functional area 80 is disposed on the first wall 70 and at least a portion of the separator 50 that is disposed adjacent to the guide channel 52.

The first functional area 80 is configured to be in contact with a portion of the spider member 14 (FIG. 2B) such as an outer roller member, also referred to as outer ball member 81 of a roller assembly, also referred to as ball assembly 83 disposed on the spider member 14. Ball assembly 83 has an inner roller member, also referred to as inner ball member 85 disposed directly on the trunnion 26 of the spider member 14, with rollers, such as needle rollers 87, being disposed between the outer ball member 81 and the inner ball member 85 to facilitate low friction relative rotation of outer ball member 81 and inner ball member 85 relative to one another.

The second wall 72 defines a second functional area 90. The second functional area 90 faces towards the first functional area 80. The second functional area 90 extends between another separator 50 and the third wall 74. The second functional area 90 is disposed on the second wall 72 and at least a portion of the separator 50 that is disposed adjacent to the guide channel 52.

The second functional area 90 is configured to be in contact with a portion of the spider member 14 (FIG. 2B), such as the outer ball member 81 of ball assembly 83 disposed on the spider member 14 in similar fashion as the ball assembly 83 in contact with the first function area 80.

The third wall 74 can be defined by a first wall portion 100, a second wall portion 102, and a third wall portion 104, by way of example and without limitation. The first wall portion 100 extends between an end of the first wall 70 and the second wall portion 102. The second wall portion 102 extends between the first wall portion 100 and the third wall portion 104. The second wall portion 102 is configured as a convex protuberance or a protrusion 106 that extends radially inwardly toward the longitudinal central axis 22. The third wall portion 104 extends between the second wall portion 102 and an end of the second wall 72.

At least a portion of the third wall 74 defines a third functional area 110. The third functional area 110 is defined at least in part by the second wall portion 102. In at least one embodiment, the third functional area 110 may be defined by at least one or more of the first wall portion 100, the second wall portion 102, and the third wall portion 104.

The third functional area 110 is configured to be in contact with a portion of the spider member 14 such as the outer ball member 81 of the ball assembly 83 disposed on the spider member 14.

As best shown in FIG. 2A, a first outer transition region 112 extends between the first wall 70 and the third wall 74 and transitions the first and third walls 70, 74 with one another, and a second outer transition region 114 extends between the second wall 72 and third wall 74 and transitions the second and third walls 72, 74 with one another. A first inner transition region 116 extends between the first wall 70 and a first separator 50a and transitions the first wall 70 and first separator 50a with one another, and a second inner transition region 118 extends between the second wall 72 and a second separator 50b and transitions the second wall 72 and second separator 50b with one another. At least one of the first outer transition region 112, the second outer transition region 114, the first inner transition region 116, and/or the second inner transition region 118 is provided by a surface having a contour profile defined by a quadratic function of a second order, in contrast to known transition regions having a straight, first order linear contour profile. The second order contour profile herein is defined providing an elliptical contour. The elliptical contour minimizes tipping of ball assemblies 83 within in the guide channels 52, which inhibits the potential for a locking condition of the ball assembly 83, and optimizes a restoring moment of the ball assemblies 83 within the guide channels 52 to promote the ball assemblies 83 to remain and return to their intended low friction running orientation within the guide channels 52.

As shown in FIG. 2A, the first outer transition region 112 and the second outer transition region 114 each have an outer elliptical contour and the first inner transition region 116 and the second inner transition region 118 each have an inner elliptical contour. As shown, the outer elliptical contours of the first outer transition region 112 and the second outer transition region 114 can be the same and the inner elliptical contours of the first inner transition region 116 and the second inner transition region 118 can be the same. Further yet, the outer elliptical contours and the inner elliptical contour can be the same; however, for optimal low rolling friction and restoring moment performance, they are different from each other, as discussed further below.

The outer elliptical contours of the first outer transition region 112 and the second outer transition region 114 each have an outer major diameter OMD and the inner elliptical contours of the first inner transition region 116 and the second inner transition region 118 each have an inner major diameter IMD, wherein the outer major diameters OMD are the same as one another and the inner major diameters IMD are the same as one another. However, the outer major diameters OMD are different from the inner major diameters IMD. In particular, the outer major diameters OMD, in order to maximize low rolling friction and restoration moment to the ball assemblies 16, are greater than the inner major diameters IMD. Accordingly, the outer elliptical contours are larger than the inner elliptical contours (FIG. 2A).

The outer major diameter OMD of each the first outer transition region 112 and the second outer transition region 114 and the inner major diameter IMD of each the first inner transition region 116 and the second inner transition region 118 extends generally transversely to the first wall 70 and the second wall 72. Accordingly, the outer major diameters OMD and the inner major diameters IMD are generally parallel with one another.

As shown in FIG. 2B, each roller assembly 83 includes the inner roller member 85 and the outer roller member 81. The inner roller member 85 is disposed on the generally spherical trunnion bearing member 26 of the spider member 14 and the outer roller member 81 is disposed for engagement with the first wall 70, the second wall 72 and the third wall 74. The outer roller member 81 has a convex outer surface 124 configured for engagement with the first outer transition region 112 and the second outer transition region 114 and a convex inner surface 126 configured for engagement with the first inner transition region 116 and the second inner transition region 118. The convex outer surface 124 and the convex inner surface 126 can each have a constant radius R, where the radius R can be the same for each, or different from one another, as best suited for optimal interaction with the respective elliptical contact surfaces of the transition regions 112, 114, 116, 118.

In accordance with another aspect, a method of manufacturing a tripot housing 20 is provided. The method includes, providing a housing body 30 extending between a first housing end 36 and a second housing end 38 along a longitudinal central axis 22. Further, forming a plurality of guide channels 52 that extend axially, relative to the longitudinal central axis 22, from the first housing end 36 toward the second housing end 38, with the plurality of guide channels 52 being spaced apart from each other circumferentially about the longitudinal axis 22 by separators 50. Further yet, forming each of the guide channels 52 having a first wall 70, a second wall 72, and a third wall 74 extending between the first wall 70 and the second wall 72, with a first outer transition region 112 extending between the first wall 70 and the third wall 74; a second outer transition 114 region extending between the second wall 72 and the third wall 74, and with a first inner transition region 116 extending between the first wall 70 and a first separator 50a; a second inner transition region 118 extending between the second wall 72 and a second separator 50b, and forming at least one of the first outer transition region 112, the second outer transition region 114, the first inner transition region 116 and/or the second inner transition region 118 having an elliptical contour.

In accordance with another aspect, the method can further include forming both of the first outer transition region 112 and the second outer transition region 114 having an elliptical contour.

In accordance with another aspect, the method can further include forming both of the first inner transition region 116 and the second inner transition region 118 having an elliptical contour.

In accordance with another aspect, the method can further include forming each of the first outer transition region 112, the second outer transition region 114, the first inner transition region 116, and the second inner transition region 118 having an elliptical contour.

In accordance with another aspect, the method can further include forming the first outer transition region 112 and the second outer transition region 114 having an outer elliptical contour having an outer major diameter OMD and forming the first inner transition region 116 and the second inner transition region 118 having an inner major diameter 1 MB, with the outer major diameter OMD being different from the inner major diameter 1 MB.

In accordance with another aspect, the method can further include forming the outer major diameter OMD being greater than the inner major diameter IMD.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A tripot housing, comprising:
a housing body extending along a longitudinal axis between a first housing end and a second housing end, the housing body defining a plurality of guide channels extending from the first housing end toward the second housing end, each of the guide channels having a first wall, a second wall substantially parallel to the first wall to facilitate line contact with a roller, and a third wall extending between the first wall and the second wall, a first outer transition region extends between the first wall and the third wall and a second outer transition region extends between the second wall and third wall, a first inner transition region extends between the first wall and a first separator and a second inner transition region extends between the second wall and a second separator, at least one of the first outer transition region, the second outer transition region, the first inner transition region and the second inner transition region having an elliptical contour.

2. The tripot housing of claim 1, wherein the first outer transition region and the second outer transition region have an elliptical contour.

3. The tripot housing of claim 1, wherein the first inner transition region and the second inner transition region have an elliptical contour.

4. The tripot housing of claim 1, wherein the first outer transition region and the second outer transition region have an outer elliptical contour and the first inner transition region and the second inner transition region have an inner elliptical contour.

5. A tripot assembly, comprising:
a housing body extending between a first housing end and a second housing end along a longitudinal axis, the housing body defining a plurality of guide channels spaced from one another by a separator, the guide channels extending from the first housing end toward the second housing end, each of the guide channels having a first wall, a second wall substantially parallel with the first wall, and a third wall extending between the first wall and the second wall, a first outer transition region extending between the first wall and the third wall and a second outer transition region extending between the second wall and third wall, a first inner transition region extending between the first wall and a first separator and a second inner transition region extending between the second wall and a second separator, at least one of the first outer transition region, the second outer transition region, the first inner transition region and the second inner transition region having a concave elliptical contour; and
a separate roller assembly disposed in each of the guide channels, each roller assembly having an inner roller member and an outer roller member, the inner roller member being disposed on a spider member and the outer roller member being disposed in engagement with the first wall and the second wall for line contact therewith and in engagement with the third wall, the outer roller member having a convex outer surface configured for engagement with the first outer transition region and the second outer transition region and having a convex inner surface configured for engagement with the first inner transition region and the second inner transition region.

6. The tripot assembly of claim 5, wherein the first outer transition region and the second outer transition region have an elliptical contour.

7. The tripot assembly of claim 5, wherein the first inner transition region and the second inner transition region have an elliptical contour.

8. The tripot assembly of claim 5, wherein the first outer transition region and the second outer transition region have an outer elliptical contour and the first inner transition region and the second inner transition region have an inner elliptical contour.

9. The tripot assembly of claim 5, wherein the convex inner surface of the outer roller member and the convex outer surface of the outer roller member have a constant radius.

10. A tripot assembly, comprising:
a housing body extending between a first housing end and a second housing end along a longitudinal axis, the housing body defining a plurality of guide channels spaced from one another by a separator, the guide channels extending from the first housing end toward the second housing end, each of the guide channels having a first wall, a second wall, and a third wall extending between the first wall and the second wall, a first outer transition region extending between the first wall and the third wall and a second outer transition region extending between the second wall and third wall, a first inner transition region extending between the first wall and a first separator and a second inner transition region extending between the second wall and a second separator, at least one of the first outer transition region, the second outer transition region, the first inner transition region and the second inner transition region having a concave elliptical contour; and
a separate roller assembly disposed in each of the guide channels, each roller assembly having an inner roller member and an outer roller member, the inner roller member being disposed on a spider member and the outer roller member being disposed in engagement with the first wall, the second wall and the third wall, the outer roller member having a convex outer surface configured for engagement with the first outer transition region and the second outer transition region and having a convex inner surface configured for engagement with the first inner transition region and the second inner transition region,
wherein the first outer transition region and the second outer transition region have an outer elliptical contour and the first inner transition region and the second inner transition region have an inner elliptical contour,
wherein the outer elliptical contour and the inner elliptical contour are different.

11. The tripot assembly of claim 10, wherein the outer elliptical contour has an outer major diameter and the inner elliptical contour has an inner major diameter, the outer major diameter being greater than the inner major diameter.

12. The tripot assembly of claim 11, wherein the outer major diameter and the inner major diameter extend generally transversely to the first wall and the second wall.

13. A tripot housing, comprising:
a housing body extending along a longitudinal axis between a first housing end and a second housing end, the housing body defining a plurality of guide channels extending from the first housing end toward the second housing end, each of the guide channels having a first wall, a second wall, and a third wall extending between the first wall and the second wall, a first outer transition region extends between the first wall and the third wall and a second outer transition region extends between the second wall and third wall, a first inner transition region extends between the first wall and a first separator and a second inner transition region extends between the second wall and a second separator, at least one of the first outer transition region, the second outer transition region, the first inner transition region and the second inner transition region having an elliptical contour,
wherein the first outer transition region and the second outer transition region have an outer elliptical contour and the first inner transition region and the second inner transition region have an inner elliptical contour,
wherein the outer elliptical contour has an outer major diameter and the inner elliptical contour has an inner major diameter, the outer major diameter and the inner major diameter being different.

14. The tripot housing of claim 13, wherein the outer major diameter is greater than the inner major diameter.

15. The tripot housing of claim 14, wherein the outer major diameter and the inner major diameter extend generally transversely to the first wall and the second wall.

16. A method of manufacturing a tripot housing, comprising:
providing a housing body extending along an axis between a first housing end and a second housing end;
forming a plurality of guide channels that extend axially from the first housing end toward the second housing end with the plurality of guide channels being radially spaced apart from each other about the longitudinal axis by separators;
forming each of the guide channels having a first wall, a second wall, and a third wall extending between the first housing end and the second housing end, with a first outer transition region extending between the first wall and the third wall and a second outer transition region extending between the second wall and the third wall, and with a first inner transition region extending between the first wall and one of the separators and a second inner transition region extending between the second wall and another of the separators;
forming at least one of the first outer transition region, the second outer transition region, the first inner transition region and the second inner transition region having an elliptical contour; and
forming the first outer transition region and the second outer transition region having an outer elliptical contour with an outer major diameter and forming the first inner transition region and the second inner transition region having an inner elliptical contour with an inner major diameter, with the outer major diameter being different from the inner major diameter.

17. The method of claim 16, further including forming the outer major diameter being greater than the inner major diameter.

18. The method of claim 16, further including forming the outer major diameter and the inner major diameter extending generally transversely to the first wall and the second wall.

* * * * *